United States Patent [19]

Petzold

[11] Patent Number: 5,007,512
[45] Date of Patent: Apr. 16, 1991

[54] TECHNIQUE FOR CLUTCH CONTROL IN CONTINUOUSLY VARIABLE TRANSMISSION SYSTEMS

[75] Inventor: Werner P. Petzold, Harwood Heights, Ill.

[73] Assignee: Borg-Warner Automotive, Inc., Sterling Heights, Mich.

[21] Appl. No.: 402,052

[22] Filed: Aug. 31, 1989

[51] Int. Cl.$^5$ .............................. B60K 41/22
[52] U.S. Cl. ................... 192/3.51; 192/3.63; 74/866
[58] Field of Search ............ 192/3.51, 3.63, 3.57, 192/3.58; 74/866, 867

[56] References Cited

U.S. PATENT DOCUMENTS

| | | | |
|---|---|---|---|
| 4,397,379 | 8/1983 | Baudoin | 192/0.032 |
| 4,433,594 | 2/1984 | Smirl | 74/689 |
| 4,458,318 | 7/1984 | Smit et al. | 364/424.1 |
| 4,526,557 | 7/1985 | Tanaka et al. | 74/861 |
| 4,542,665 | 9/1985 | Yamamuro et al. | 74/866 |
| 4,583,627 | 4/1986 | Kumura et al. | 192/0.076 |
| 4,648,496 | 3/1987 | Petzold et al. | 192/0.076 |
| 4,653,621 | 3/1987 | Oshiage | 192/0.032 |
| 4,663,714 | 5/1987 | Cornell et al. | 364/424.1 |
| 4,665,773 | 5/1987 | Hiramatsu et al. | 74/866 |
| 4,701,853 | 10/1987 | Osanai | 74/866 |
| 4,730,712 | 3/1988 | Ohkumo | 192/0.076 |
| 4,793,454 | 12/1988 | Petzold et al. | 192/0.032 |
| 4,805,751 | 2/1989 | Ohkumo et al. | 192/0.076 |
| 4,811,225 | 5/1989 | Petzold et al. | 364/424.1 |
| 4,856,380 | 8/1989 | Murano et al. | 192/3.58 |

FOREIGN PATENT DOCUMENTS 0139277 5/1985 European Pat. Off. .
0196807 10/1986 European Pat. Off. .

*Primary Examiner*—Rodney H. Bonck
*Assistant Examiner*—Nicholas Whitelaw
*Attorney, Agent, or Firm*—Neuman, Williams, Anderson & Olson

[57] ABSTRACT

An improved clutch control system in a continuously variable transmission driven vehicle monitors driver selection of forward or reverse and implements the specific parameters for each. The control logic provides a preselected time interval for sensing of a pressure drop associated with the transition from one operating mode to another, such as from neutral to forward. The system provides for sensing that pressure drop and providing a desired fluid flow rate for clutch actuation consistent with the desired performance. The system also monitors pressure in the fluid actuation system at the end of the predetermined interval to ascertain when the pressure reaches a desired higher level indicative of a control characteristic to provide desired vehicle response to driver demand. Fluid flow to the clutch is controlled at a corresponding rate to provide a desired operating characteristic and to facilitate transition into a subsequent vehicle operating mode. Length of time frame for the associated timer depends upon characteristics of specific engines. The timer times out in a time normally required for reaching the desired, second pressure level to allow transition to subsequent operating mode.

23 Claims, 4 Drawing Sheets

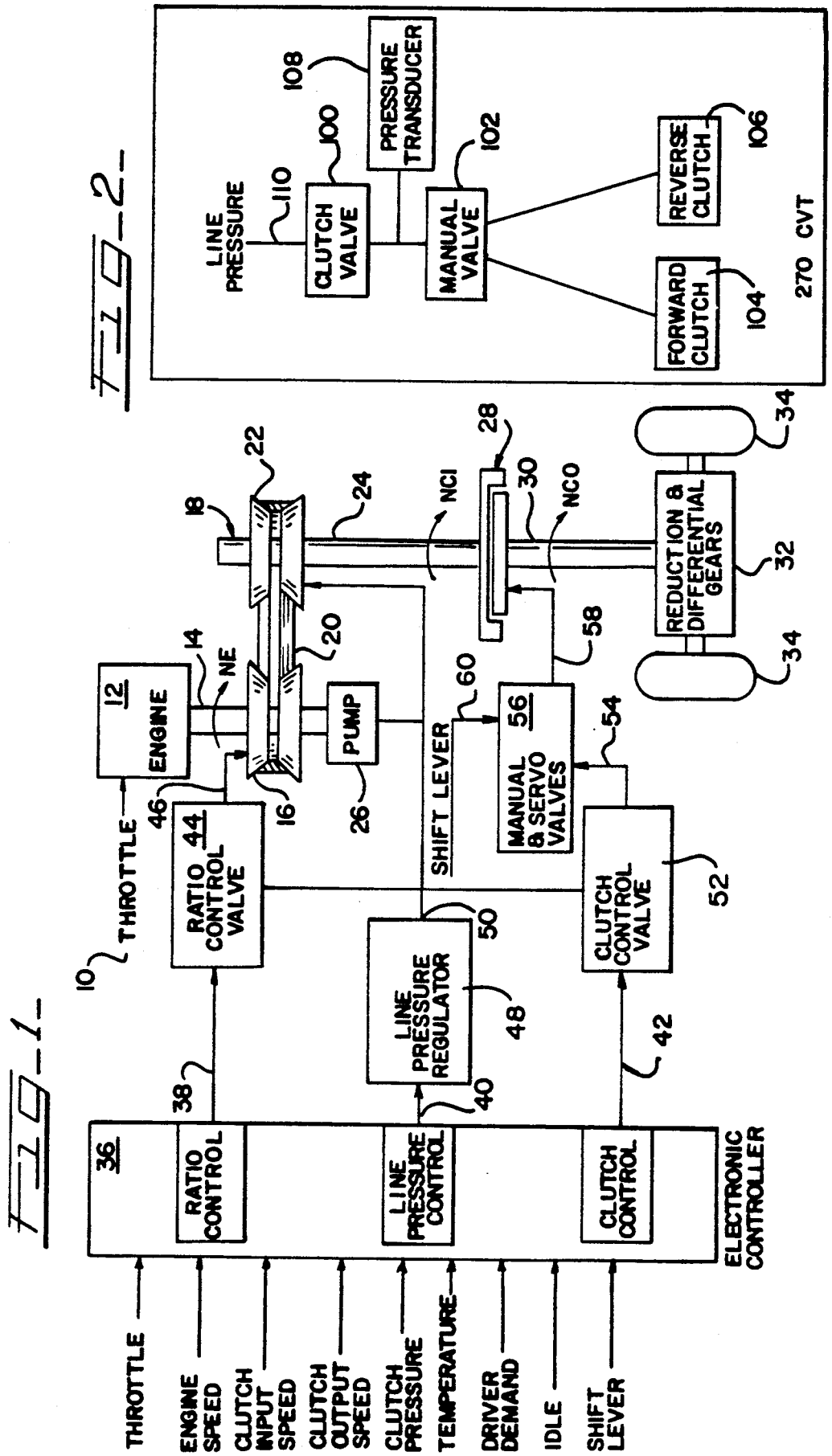

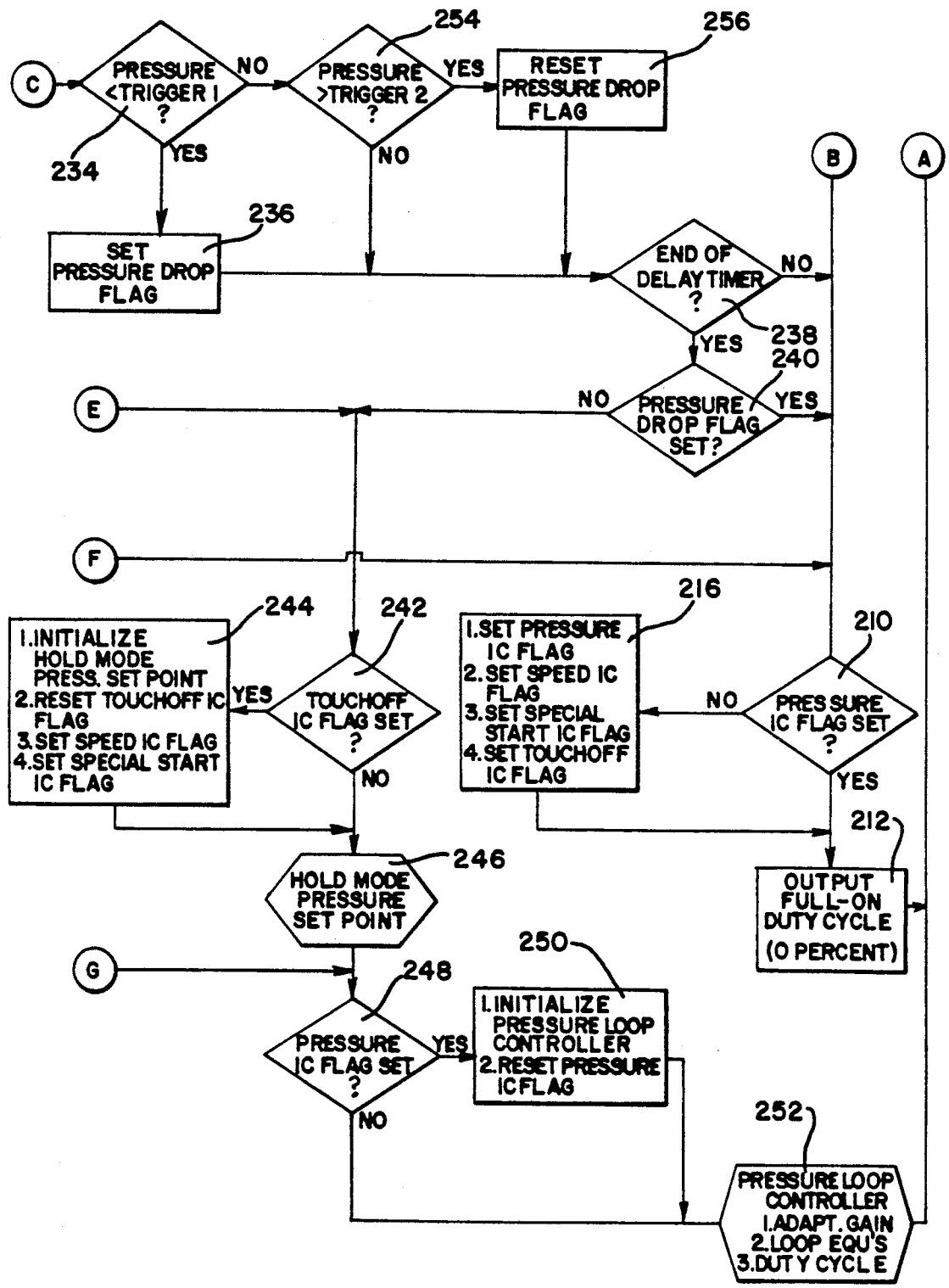

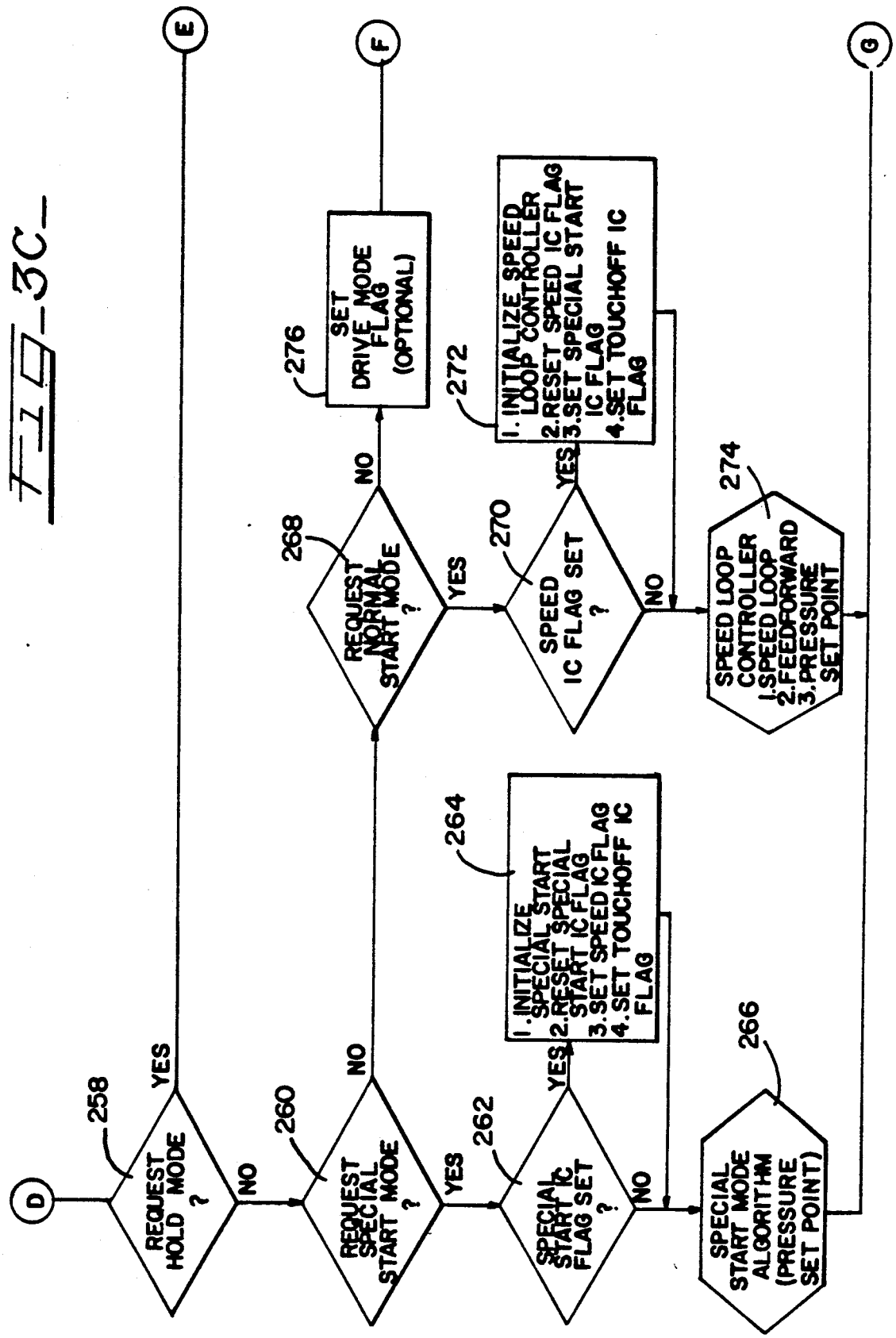

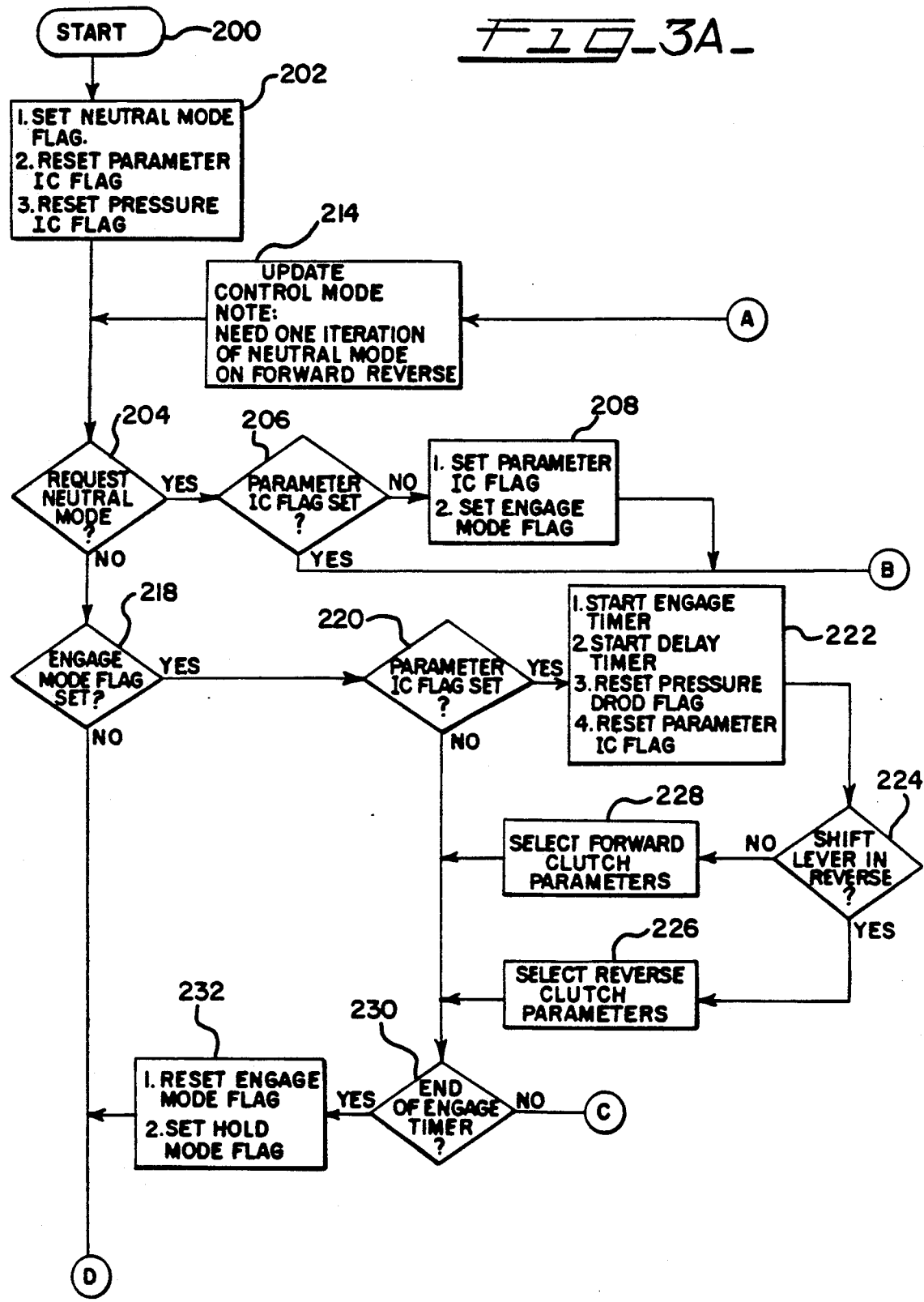

TECHNIQUE FOR CLUTCH CONTROL IN CONTINUOUSLY VARIABLE TRANSMISSION SYSTEMS

BACKGROUND OF THE INVENTION

The present invention relates generally to the continuously variable transmission art. More particularly, the present invention relates to clutch control in continuously variable transmission (CVT) systems in which fluid flow is used to actuate one or more clutches. Specifically, the present invention provides an improved technique, including means and method, for clutch control in a fluid actuated CVT system.

Generally, continuously variable transmissions (CVT's) are well known in the art. A particularly popular version of the CVT system utilizes two adjustable pulleys, each pulley having at least one sheave which is axially fixed and another sheave which is axially movable relative to the first sheave. A flexible belt of metal or elastomeric material intercouples the pulleys. The interior faces of the pulley sheaves are beveled or chambered. As the axially displaceable sheave moves relative to the fixed sheave on each of the pulleys, the distance between the sheaves and thus the effective pulley diameter may be adjusted. The displaceable sheave typically includes a fluid constraining chamber for receiving fluid to move the sheave and thus change the effective pulley diameter; as fluid is exhausted from this chamber, the pulley diameter changes in the opposite sense. Generally, the effective diameter of one pulley is adjusted in one direction as the effective diameter of the second pulley is varied in the opposite direction, thereby affecting a change in the drive ratio between an input shaft coupled to an input pulley and an output shaft coupled to an output pulley. The ratio changes continuously as the pulley diameters vary. The input shaft typically connects to a drive source, such as an automobile engine; the output shaft typically connects to the drive line of the vehicle. A clutch is typically connected in the drive line to control the transfer of torque to the vehicle wheels. Such transmissions, thus, are referred to in the art as continuously variable transmission systems, or CVT's.

As is also known in the art, an hydraulic system typically controls the transfer of fluid in the CVT system. In addition to controlling actuation of the pulley sheaves, the fluid in the CVT system may be further regulated to control actuation of the clutch. Of course, actuation of the clutch controls transfer of torque from the engine, in a ratio controlled by the ratio of the pulleys, to a drive line connected to vehicle wheels to effect movement of the vehicle. Various clutch control techniques for effecting selective actuation of the clutch to provide a desired torque transfer in a number of different operation modes are known in the art.

The present invention relates generally to the same field of endeavor as that of U.S. Pat. No. 4,793,454, entitled "Continuously Variable Transmission Clutch Control System", and U.S. Pat. No. 4,648,496, entitled "Clutch Control System for a Continuously Variable Transmission." Both of these patents are assigned to the assignee of the present application. These patents generally describe logic techniques for regulating pressure at a clutch in a CVT system to provide the desired torque transfer from an engine to a vehicle drive line. Typically, clutch control depends on logical recognition of one of a number of operating modes.

The teachings of each of the above mentioned patents are incorporated herein by reference in terms of background to the present invention, although practical problems may arise in the implementation of the previously envisioned systems in particular applications.

BRIEF SUMMARY OF THE INVENTION

The principal object of the present invention lies in providing a continuously variable transmission clutch control system which generally overcomes the deficiencies of the prior art.

A further object of the present invention may be found in improving the response of a continuously variable transmission driven vehicle to changes in driver demand while the clutch is being controlled.

Yet a further object of the present invention may be found in improving the overall operating characteristics of a continuously variable transmission driven vehicle when it is operated in either forward or reverse mode or undergoes a transition between operation modes, such as from neutral to forward or from neutral to reverse.

Generally, the present invention provides an improved clutch control system for use in a continuously variable transmission driven vehicle. The improved control monitors the driver selection of forward or reverse and implements specific parameters for each. Further, the envisioned controller provides a preselected time interval for sensing of a predetermined pressure drop upon transition from one operating mode to another, for example, from neutral to forward. The system then provides for sensing that pressure drop and providing a desired fluid flow rate for clutch actuation consistent with a desired performance. The system further monitors the pressure in the fluid actuation system at the end of the predetermined interval to ascertain when the pressure reaches a desired higher level indicative of a control characteristic to provide desired vehicle response to driver demand. Fluid flow to the clutch is controlled then at a corresponding rate to provide this desired operating characteristic and to facilitate transition into a subsequent vehicle operating mode. Additionally, the operation of this logic system is constrained within a time frame consistent with normal operating characteristics of each engine to be coupled to the particular CVT system. This associated timer times out in the time normally required for reaching the desired, second pressure level to thereby allow transition to a subsequent operating mode.

Additional and further objects and advantages of the present invention will become apparent from the following detailed description and accompanying drawings.

BRIEF DESCRIPTION OF THE DRAWINGS

The novel features of the present invention are set forth with particularity in the appended claims. The invention, together with the objects and advantages thereof, may be understood more fully by reference to the following detailed description taken in conjunction with the accompanying drawings in which like reference numerals are used to indicate like elements and of which:

FIG. 1 is a block diagram representation of the CVT system utilizing the improved control system of the present invention;

FIG. 2 is a block diagram representation of the coupling of the various mechanical and servo-mechanical elements of a clutch control system; and FIGS. 3A, B and C together comprise a flow chart representation of the logical operation of the general CVT system, such as that shown in FIG. 1, consistent with the block logic laid out in FIG. 2.

DETAILED DESCRIPTION OF A PREFERRED EMBODIMENT

Referring now to FIG. 1, therein is shown a general block diagram, schematic representation of a CVT system including an electronic controller and a representation of the pulley-belt and clutch arrangement for transferring torque between an engine and the drive wheels of a vehicle. More particularly, a throttle signal 10 controls the operation of an engine 12 which transmits torque via a shaft 14 to a primary pulley 16 in a CVT 18. In a typical embodiment, a fly wheel and damping arrangement may be included on the shaft 14 between the engine 12 and the primary pulley 16. A metal or elastomeric belt 20 connects the primary pulley 16 to a secondary pulley 22 to transmit torque to a second shaft 24. A pump 26 may also be driven by the first shaft 14 to generate pressure in a fluid line for the hydraulic system for controlling the CVT 18 and the clutch operation.

The second shaft 24 drives the input to a clutch 28 which in turn provides a torque to a third shaft 30 in accordance with the amount of pressure exerted between the plates of the clutch 28. The third shaft 30 in turn drives a reduction differential gear arrangement 32 as a drive line to provide power to vehicle wheels 34.

In operation, an electronic controller 36 receives a variety of inputs including throttle, engine speed, clutch input speed, clutch output speed, clutch pressure, temperature, driver demand, idle, shift lever and other information input signals as shown generally at the left of FIG. 1. The electronic controller 36 operates in a logical fashion to provide a ratio control signal on a line 38 and a line pressure control signal in a line 40. The electronic controller 36 also operates in a logical fashion which is discussed in greater detail below to provide a clutch control signal on a line 42.

The signal on the line 38 to a ratio control valve 44 controls the hydraulic pressure on a line 46 to the primary pulley 16 of the CVT 18 to control the ratio between the primary pulley 16 and the secondary pulley 22. This may be described generally as the belt ratio (RATC). The signal on the line 40 communicates with a line pressure regulator 48. The line pressure regulator 48 provides line pressure from fluid flow from the pump 26 via a conduit 50 to the ratio control valve 44 and to a clutch control valve 52. The output of the line pressure regulator on the line 50 also controls pressure at the secondary pulley 22 to ensure that the belt 20 does not slip.

The output signal on the line 42 to the clutch control valve 52 controls the output of the clutch control valve 52 on a line 54 to the manual and servo valves shown generally at 56. These valves together control the fluid flow on the line 58 to the clutch 28. This signal on the line 58 thereby provides the pressure at the clutch 28 and hence regulates the torque transfer from the second shaft 24 to the third shaft 30.

The ratio control valve 44 may be controlled in a preferred embodiment as set forth in an application entitled "Ratio Control Technique For A Continuously Variable Transmission System", Ser. No. 25,389, filed Mar. 13, 1987 and assigned to the assignee of the present application, the teachings of which are incorporated herein by reference.

The shift lever signal on a line 60 provides an additional control of the manual and servo valve arrangement 56. When the shift lever signal on the line 60 indicates that the vehicle is in a neutral or parked mode, the manual control within the valve arrangement 56 is closed. This prevents fluid from flowing to the clutch 28 and thus prevents any torque transfer through the clutch 28 when the vehicle is in the neutral mode.

A first arrow NE (N = speed; E = engine) on the first shaft 14 indicates one acceptable point of measurement of engine speed. A second arrow NCI (CI=clutch input) on the second shaft 24 indicates an acceptable point of measurement for the clutch input speed. A third arrow NCO (CO=clutch output) indicates an acceptable point of measurement for the clutch output speed, which corresponds generally to vehicle speed. These arrows are provided by way of example for pick-up points for the various speed measurements used in the control of the CVT system in the vehicle. Those skilled in the art will recognize that the various speed values may be accurately obtained at other locations in the system. Any acceptable electromagnetic or other transducer may be used to monitor the shaft rotation speeds or otherwise to provide acceptable measurements of these various speed indications.

It should be appreciated that the ratio NE to NCI will correspond to and provide a measure of the transmission belt ratio, RB. The difference between NCI and NCO provides a measure of the slippage at the clutch 28. When NCI=NCO, the clutch 28 is locked-up with no slippage.

As mentioned above and explained in previous patents and applications, systems such as that of FIG. 1 operate in a number of driving or vehicle operation modes. A main logic section determines which of these modes the system is operating in and accordingly provides appropriate information for clutch control. The overall logic for the clutch control in the system of the present invention is set forth in more detail in the flow charts of FIG. 3A, B and C. The following represents a brief description of the modes of operation and the general characteristics of the clutch during those modes as envisioned for use in accordance with the present invention.

NEUTRAL MODE: The shift lever is in neutral or park, and the clutch is de-stroked, i.e., the clutch plates are disengaged. A full-on duty cycle is sent to the clutch control valve, but flow to the clutch is blocked by the manual valve. This corresponds to the engine running while the vehicle is in park or neutral but prevents torque transfer between the engine and the vehicle drive line at such time. The full on duty cycle (0%) holds the clutch control valve open to line pressure to thereby eliminate the selenoid pulse width modulation noise in this mode.

ENGAGE MODE: Operation of the clutch control system in this mode represents a principle application of the advantages of the present invention. The system engages the clutch without transmitting any torque through it. This mode provides for stroking of the clutch before clutch torque is requested. The engage mode is entered on a transition out of neutral mode, and defaults to a hold mode at the end of a preselected time. Forward or reverse clutch parameters are set in accordance with a desired logic in this mode. Pressure drop information, which occurs when the manual valve opens to the clutch, is used to control clutch engagement. When the pressure drop is of a sufficient magnitude, the full on duty cycle is maintained to facilitate rapid filling of the clutch actuator. At such time that the pressure at the clutch actuation cylinder nears the desired pressure level, a closed loop pressure control begins to regulate the clutch pressure to bring it up to the desired touch-off pressure set point. An additional timer may be used to ensure that the clutch control valve remains wide open until such time that a pressure drop condition may be sensed. This mode corresponds to a transition between the neutral and the hold mode.

HOLD MODE: Generally, the operation in the hold mode maintains the clutch in a stroked but essentially no-torque condition. The clutch pressure is controlled through the closed loop pressure control loop to the hold mode (touchoff) pressure set point. At this pressure, the plates are engaged, and a small amount of vehicle creep occurs; the amount is adjustable by changing the value of PCE in the loop. This corresponds generally to the vehicle being in an idle condition.

SPECIAL START MODE: This mode controls re-engagement of the clutch under conditions other than normal start, when lock-up of the clutch would tend to deliver torque to the engine (i.e., coasting or engine braking). Clutch pressure is controlled through a closed loop to a set point as calculated by the special start mode algorithm described more fully in previous applications, co-pending applications, such as Ser. No. 377,747 filed July 6, 1989, which is a continuation of Ser. No. 25,476 filed Mar. 13, 1987, both entitled "Special Start Technique For Continuously Variable Transmission Clutch Control" and assigned to the assignee of the present application. The teachings of these applications are incorporated by reference.

NORMAL START MODE: Operation in this mode controls engagement of the clutch during normal start situations (e.g. driver demand, vehicle essentially stopped). Engine speed is controlled through a closed loop to a prescribed set point by modulating clutch pressure. Set point for the pressure loop is derived from speed loop error signals and from a throttle feed forward schedule. Because of the speed loop polarities, common normal start mode will function correctly only under conditions when the engine delivers torque to the vehicle, such as normally associated with power on conditions.

DRIVE MODE: Operation in this mode maintains the clutch in a locked-up state. The controller outputs a full on duty cycle (0%) to the clutch control valve to keep the plates locked. Clutch pressure follows line pressure and no slippage is allowed at the clutch. Referring now to FIG. 2, therein is shown a schematic representation of the arrangement of a clutch valve 100, a manual valve 102 and forward and reverse clutches 104 and 106, respectively, as envisioned for a preferred embodiment of the present invention. Also shown is a pressure transducer 108. In contrast to previous systems, the system of FIG. 2 includes both a forward clutch (104) and a reverse clutch (106) for improved system performance. The pressure transducer (108) has also been moved upstream of the manual valve (102) to provide continued pressure readings at the output of the clutch control valve even when the manual valve is completed closed to prevent fluid flow to the clutch(es). Thus, in the system of FIG. 2, pressure may be accurately sensed during the neutral and park modes. Further, the arrangement of FIG. 2 facilitates accurate measurement of a pressure drop as typically occurs upon a transition out of neutral or park.

In operation, the clutch valve 100 and the manual valve 102 control transmission of line pressure from a line 110 to the forward and reverse clutches 104 and 106 in accordance with the control logic of the system. As can be seen from this arrangement, the manual valve 102 may effectively control the cut-off of line pressure, and hence fluid flow, to the clutches regardless of the condition of the clutch valve 100. For this reason, as set forth above, in the off or neutral/park mode, the clutch valve 100 is left fully open to eliminate undesired solenoid noises.

Referring now to FIG. 3A, therein is shown a first portion of a flow chart representing the logical operation of clutch control in accordance with a preferred embodiment of the present invention. Generally, operation begins as shown at a start block 200. Subsequent to initiation of the operation, the neutral mode flag is set, the parameter initial condition flag is re-set, and the pressure initial condition flag is re-set as shown generally at a block 202. Subsequent to the setting operations described at block 202, the system determines whether the neutral mode has been requested by the driver at a decision block 204. If so, the parameter initial condition flag is evaluated at a decision block 206. If the parameter initial condition flag has not been set, then it is set at a block 208 in conjunction with setting the engage mode flag. The sequence of logic steps generally corresponds to engine start-up.

After the steps shown at block 208, the system advances to a decision block 210 shown in FIG. 3B to determine whether the pressure initial condition flag has been set. This system advances to this point, regardless of whether the parameter initial condition flag ha been set. If the pressure initial condition flag has been set, the system advances to the next stage shown generally at a block 212 which outputs the full on duty cycle (0%) to the clutch control valve and then loops back to update the control mode as shown at a block 214. If the pressure initial condition flag has not been set, the system advances from the decision block 210 to a stage shown generally at a block 216. At block 216 the pressure initial condition flag is set, the speed initial condition flag is set, the special start initial condition flag is set, and the touch-off initial condition flag is set. The system then advances to the stage shown at the block 212 and loops back to the update control block shown at 214. Again, as described above, this sequence corresponds generally to engine start-up, although many of the same steps are performed in conjunction with additional operating modes as discussed below.

Referring again to the initial steps of the flow chart of FIG. 3A, if the neutral mode has not been requested as determined at the decision block 204, the system advances to the next stage shown generally as decision block 218 in which it is determined whether the engage mode flag has been set. This corresponds to the transition from the neutral mode to either the forward or reverse operation modes for the vehicle. As shown at block 214, at least one iteration of the foregoing described neutral mode logic sequence is required upon a forward to reverse or reverse to forward transition.

If the engage mode has been set as determined at block 218, the system advances to the next stage shown generally at the decision block 220 in which the parameter initial condition flag is evaluated. If that flag has been set, the system advances to a step shown generally at block 222 in which the engage timer is started, the delay timer is started, the pressure drop flag is re-set, and the parameter initial condition flag is re-set. In accordance with the requirement that at least one neutral mode iteration be performed for each forward-/reverse transition, during the first time through the logic steps of the engage mode the parameter initial condition flag will have been set. This ensures the starting o the engage and delay timers, the integrity of the initial pressure drop determination (by resetting the pressure drop flag) as discussed below and the implementation of the correct parameters for forward and reverse.

Subsequent to the step shown in block 222, the system then determines whether the manual shift lever has been placed in reverse as shown at a block 224. If yes, the system advances to a step as shown at block 226 and selects the reverse clutch parameters. If the reverse lever has not been set, this system advances as shown to a step at block 228 and selects the forward clutch parameters. The selected parameters then control clutch operation until there is at least one neutral mode iteration which sets the parameter initial condition flag and the appropriate parameters are againn selected by the branching action of logic block 220. In this fashion, the appropriate clutch control and desired clutch operating characteristics are selected consistent with the improved system layout of FIG. 2.

Subsequent to the selection of either the reverse or forward clutch parameters, the system advances to determine whether the engage timer has timed out as shown at a decision block 230. The system also advances directly to block 230 from decision block 220 during subsequent iterations of the engage mode logic because of the resetting actions performed in the initial engage iteration at the block 222.

If the engage timer has timed out, the system advances to the next step shown generally at a block 232 at which the engage mode flag is reset and the hold mode flag is set. This represents the end of the engage mode and the beginning of the hold mode. However, if the engage timer has not timed out as determined at the decision block 230, the system advances to a stage for sensing the pressure at the clutch.

A first evaluation of the clutch pressure is performed as shown generally at a decision block 234 shown in FIG. 3B. At this time, the preferred embodiment determines whether the pressure is less than a first trigger level. If yes, the selected pressure drop has been sensed and the pressure drop flag is set as shown generally at a block 236. This represents the sensing of the pressure drop of the transducer 108 of FIG. 2 typically associated with a transition from neutral or park and the corresponding opening of the manual valve 102. If the pressure drop flag is set, the system then determines whether the delay timer has timed out as shown at a block 238. If no, the system then advances directly to the decision block 210 and subsequently to the steps shown at block 212 at which the full on duty cycle is output to the clutch control valve to facilitate rapid filling of the clutch actuation chamber.

If, however, the delay timer has timed out as determined at decision block 238, the system advances to determine whether the pressure drop flag has been set as shown at a block 240. If yes, the same sequence of events occurs in which the full on duty cycle is output at the block 212. If no, however, this system advances to another stage as shown at a decision block 242. At this stage, the system determines whether the touch off initial condition flag has been set. If yes, then the hold mode pressure set point is initialized, the touch off initial condition flag is re-set, the speed initial condition flag is set, and the special start initial condition flag is set as shown generally at a block 244.

The system then advances to the hold mode pressure set point steps shown generally at a block 246. This occurs also if the touch off initial condition flag has not been set. Subsequent to the steps shown in block 246, the system evaluates whether the pressure initial condition flag has been set at a block 248. If yes, the system initializes the pressure loop controller and resets the pressure initial condition flag as shown generally at a block 250. Subsequent to the steps shown at 250, the system advances to control by the pressure loop controller as shown generally at a step 252. In step 252, an adaptive gain is utilized in accordance with loop equations to output the appropriate duty cycle to maintain the desired pressure in the loop.

The system also advances to this step shown at 252 if the pressure initial condition flag has not been set. The system of the present invention arrives at this point without the pressure initial condition flag being set only subsequent to operation in one of the start modes as described below.

Referring once again to the step shown generally at the decision block 234, if the pressure is not less than the first trigger value, the system advances to a second pressure sensing step shown generally at a decision block 254 to determine whether the pressure is greater than a second trigger level. If no, then the pressure lies between the first and second trigger points and the system advances to the decision block 238 and the subsequent steps described above. If, however, the pressure is above the second pressure trigger value, as determined at the block 254, the system advances to a step shown generally a block 256 at which the pressure drop flag is reset. This will set in course the sequence of events which typically result in the control of the clutch control valve being passed to the pressure loop controller rather than the full on duty cycle being output. Generally, after the end of the delay timer the system advances from block 238, to block 240 and then to the pressure loop initiating step at block 242. Reiteration of the specific operations associated with these steps is not deemed necessary in view of the foregoing description.

Once the engage timer has timed out and the engage mode flag has been reset, the system will advance to the subsequent determination of an operating mode as shown in the flow chart portions illustrated in FIGS. 3C. At a decision block 258, the system determines whether the hold mode has been requested. If yes, the system advances to the decision block 242 and subsequent events as discussed above.

If, however, the hold mode has not been requested as determined at the block 258, the system advances to determine whether the special start mode has been requested as shown at a block 260. If yes, the system advances to a second decision block 262 to determine whether the initial conditions for the special start have been set. If yes, then the special start is initialized, the special start initial condition flag is reset, the speed initial condition flag is set, and the touch off initial condition flag is set as shown generally at a block 264. Subsequent to this step, or if the special start initial condition flag had not been set, the system advances to a stage shown generally at a block 266 in which the special start mode algorithm (pressure set point) control is used for the clutch control. The system then advances generally to the logic step shown at decision block 248 and the subsequent events described above.

Returning again to the decision block 260, if the special start mode has not been requested, the system advances to a decision block 268. At this step, the system determines whether normal start mode has been requested. If yes, at a decision block 270, the system evaluates the speed initial condition flag. If it has been set, the system advances to a step shown generally at block 272 at which the speed loop controller is initialized, the speed initial condition flag is re-set, the special start initial condition flag is set, and the touch off initial condition flag is set. Subsequent to this step, or if the speed initial condition flag was not set, the system advances to a new stage shown generally at a block 274. At this step, the speed loop controller is initiated, the speed loop entered, and the feed forward and the pressure set point control pressure to the clutch. The system then advances to the decision block 248 and subsequent steps as described above.

Returning now to decision block 268, if the normal start mode has not been requested, the system defaults to the drive mode as shown generally at a block 276. From this step, the system advances to the decision block 210, and ultimately to the steps shown at block 212 at which the full on-duty cycle is out put to the clutch control valve.

The foregoing description of the clutch control logic includes references to numerous control modes and to corresponding mode flags. The operating modes of the clutch control are the same as the control strategy (discussed previously) modes and are selected by setting the appropriate mode flag. The exception is engage mode which is not requested by the control strategy, but is executed automatically in the clutch control logic. Table I below shows the desired mode flag conditions for a preferred embodiment.

TABLE I

| MODE FLAGS | | | | | | CLUTCH CONTROL MODE |
|---|---|---|---|---|---|---|
| Neutral | Engage | Hold | Special Start | Normal Start | Drive | |
| 1 | 1 | d | d | d | d | Neutral |
| 0 | 1 | d | d | d | d | Engage |
| 0 | 0 | 1 | d | d | d | Hold |
| 0 | 0 | 0 | 1 | d | d | Special Start |
| 0 | 0 | 0 | 0 | 1 | d | Normal Start |
| 0 | 0 | 0 | 0 | 0 | d | Drive |

1 = set,
0 = reset,
d = don't care

In addition to the clutch control mode flags set forth above, the preferred embodiment of the present invention uses several other logic-indicating flags.

The "Pressure Drop Flag" is used in the engage mode. This flag is set when the pressure drop condition exists. When set, the controller outputs the full-on (0 percent) duty cycle as a result of the logic steps described above.

A "Feedforward Disable Flag" is used in the special start mode algorithm to either include or disable the throttle feedforward function.

As discussed previously "Engage Timer" terminates the engage mode on time-out. The engage time should be greater than or equal to the longest time required to stroke the clutch. This may be dependent upon the specific engine used in an application and the corresponding clutch dimensions and performance characteristics.

The "Delay Timer" becomes effective when entering engage mode to maintain the full-on (0 percent) duty cycle output to the valve until the pressure drop condition is sensed. The delay time should be equal to the longest time required to sense the pressure drop, but not longer.

The "Clutch Pressure Triggers" comprise two triggers that are used in the engage mode to define the pressure drop condition. The first trigger senses the pressure drop and should be placed sufficiently low. The second trigger terminates the pressure drop and should be close to the touchoff pressure. The level of the second trigger should be greater than that of the first trigger. A filtered clutch pressure signal may be used desirably to establish the trigger points.

The foregoing description of the clutch control logic also references a number of initial condition flags. Five initial condition flags are provided and are used to initialize the various operating modes of the clutch control, as follows:

| | |
|---|---|
| Parameter IC flag: | Select either forward or reverse clutch parameters; Note: for proper selection of the forward or reverse clutch parameters, it is necessary to have at least one iteration of neutral mode on a forward-reverse shift lever transition. |
| Touchoff IC flag: | Initialize hold mode (touchoff) pressure set point. |
| Special Start IC flag: | Initialize special start mode algorithm. |
| Speed IC flag: | Initialize speed loop controller. |
| Pressure IC flag: | Initialize pressure loop controller. |

Table II below sets forth the desired status for these initial condition flags during the various clutch control modes.

| INITIAL CONDITION FLAGS | | | | | CLUTCH CONTROL MODE |
|---|---|---|---|---|---|
| Parameter | Touchoff | Special Start | Speed | Pressure | |
| 1 | 1 | 1 | 1 | 1 | Neutral |
| 0 | 1 | 1 | 1 | 1 | Engage/full-on |
| 0 | 0 | 1 | 1 | 0 | Engage/hold |
| 0 | 0 | 1 | 1 | 0 | Hold |
| 0 | 1 | 0 | 1 | 0 | Special Start |
| 0 | 1 | 1 | 0 | 0 | Normal Start |
| 0 | 1 | 1 | 1 | 1 | Drive |

1 = set,
0 = reset

The sample rates for the described control system may be any that are found to be acceptable for particular implementations. In a preferred embodiment, the following rates have been found to be acceptable.

| | |
|---|---|
| Pressure loop | 5 msec |
| Speed loop | 10 msec |
| Feedforward | 10 msec |
| Special start | 10 msec |

-continued

| Set points | 20 msec |
|---|---|

Correspondingly, the following scale factors are given by way of example consistent with a preferred embodiment.

| | |
|---|---|
| Belt ratio | 1 = 1 count |
| Clutch input speed | 1 RPM = 1 count |
| Clutch output speed | 1 RPM = 1 count |
| Duty cycle | 1% = 122.88 counts |
| Engine speed | 1 RPM = 1 count |
| Pressure | 1 PSI = 3.654 counts |
| Temperature | 1 deg C. = 1 count |
| Throttle | 1% = 1 count |
| Torque | 1 FT. LB = 4 counts |

While the exact values of the described logic constants should be chosen to accommodate particular applications of the present invention, the following are preferred for the instant embodiment. The following Table III sets forth the exemplary values for the pressure loop constants.

TABLE III

| NAME | DESCRIPTION | PHYSICAL VALUE | ECU VALUE |
|---|---|---|---|
| FORWARD CLUTCH PARAMETERS: | | | |
| PCEF | Touch-off pressure | 56.4 psi | 206 |
| KAPCNF | Nominal Pressure loop gain | 0.119% d.c./psi | 4 |
| CPDCF | Lead/Lag lead term | 10.0 Hz | 10 |
| BPDCF | Lead/Lag lag frequency | 100.0 HZ | .043 |
| DPICF | Integrator/Lead | 3.0 Hz | .094 |
| REVERSE CLUTCH PARAMETERS: | | | |
| PCER | Touch-off pressure | 56.4 psi | 206 |
| KAPCNR | Nominal Pressure loop gain | 0.119% d.c. psi | 4 |
| CPDCR | Lead/Lag lead term | 10.0 Hz | 10 |
| BPDCR | Lead/Lag lag frequency | 100.0 Hz | .043 |
| DPICR | Integrator/Lead lead term | 3.0 Hz | |
| COMMON PARAMETERS: | | | |
| X1PDC0 | Lead/Lag IC | 0.0% duty cycle | 0 |
| X2PIC0 | Integrator/Lead | 0.0% duty cycle | 0 |
| X2UPIC | Upper Integrator Limit | 35.0% duty cycle | 4301 |
| X2LIPC | Lower Integrator Limit | −35.0% duty cycle | −4301 |
| NPC | Pressure Loop Null | 50.0% duty cycle | 6144 |

In conjunction with the pressure loop constants of Table III, the following table sets forth acceptable examples of pressure loop variables.

TABLE IV

| NAME | DESCRIPTION | PHYSICAL VALUE |
|---|---|---|
| PCC | Clutch pressure setpoint psi | |
| PCLUSP | Clutch pressure setpoint psi with touch-off pressure added | |
| PCLU | Clutch pressure | psi |
| PLSF | Filtered line pressure setpoint | psi |
| KAPC | Pressure loop gain | % d.c./psi |
| E1PC | Pressure error | psi |
| E2PC | Proportional control signal | % duty cycle |
| E3PC | Lead/lag control signal | % duty cycle |

TABLE IV-continued

| NAME | DESCRIPTION | PHYSICAL VALUE |
|---|---|---|
| X1PDC | Lead/Lag state variable | % duty cycle |
| E4PC | Integrator/Lead control signal | % duty cycle |
| X2PIC | Integrator/Lead state variable | % duty cycle |
| E5PC | Output duty cycle signal | % duty cycle |

The following Table V sets forth acceptable exemplary speed loop constants for a preferred embodiment.

TABLE V

| NAME | DESCRIPTION | PHYSICAL VALUE | ECU VALUE |
|---|---|---|---|
| FORWARD CLUTCH PARAMETERS: | | | |
| KASCNF | Nominal Speed loop gain | 0.137 psi/rpm | .500 |
| ATCLUF | Inverse clutch gain | 1.234 psi/ft-lb | 1.128 |
| REVERSE CLUTCH PARAMETERS: | | | |
| KASCNR | Nominal Speed loop gain | 0.137 psi/rpm | .500 |
| ATCLUR | Inverse clutch gain | .795 psi/ft-lb | 0.725 |
| COMMON PARAMETERS: | | | |
| BSFC | Speed setpoint filter frequency | 0.25 Hz (Tsamp = .020) | .969 |
| BFFC | Feed forward filter frequency | 0.25 Hz (Tsamp = .020) | .969 |

Corresponding to the speed loop constants of Table V, the following Table VI sets forth speed loop variables that are deemed to be acceptable in a preferred embodiment.

| NAME | DESCRIPTION | PHYSICAL VALUE |
|---|---|---|
| THRT | Throttle position | % throttle |
| NESPC | Speed setpoint | rpm |
| TRQEN | Feed forward torque | ft-lb |
| NESPCF | Filtered speed setpoint | rpm |
| NE | Measured engine speed | rpm |
| NEFIL | Filtered engine speed | rpm |
| TRQENF | Filtered feed forward torque | ft-lb |
| XSFC | Speed setpoint filter state variable | rpm |
| XFFC | Feed forward filter state variable | ft-lb |
| RATC | Belt ratio | |
| KASC | Ratio adjusted speed loop gain | psi/rpm |
| TRQCN | Ratio adjusted feed forward | ft-lb |
| PCLUN | Feed forward pressure | psi |
| E1SC | Speed error | rpm |
| E2SC | Proportional control signal | psi |

The present clutch control logic further includes operation in a special start mode. The following Table VII sets forth special start constants for use in a preferred embodiment.

| NAME | DESCRIPTION | PHYSICAL VALUE | ECU VALUE |
|---|---|---|---|
| FORWARD CLUTCH PARAMETERS: | | | |
| ATCLUF | Inverse clutch gain | 1.234 psi/ft-lb | 1.128 |
| DINTF | Slip speed integrator gain | 0.05 psi - rpm sec | .00183 |
| CONSSF | Ramp constant | 10.0 psi/sec | .365 |
| REVERSE CLUTCH PARAMETERS: | | | |
| ATCLUR | Inverse clutch gain | .794 psi/ft-lb | 0.725 |
| DINTR | Slip speed integrator gain | 0.05 psi/rpm/sec | .00183 |
| CONSSR | Ramp constant | 10.0 psi/sec | .365 |
| COMMON PARAMETERS: | | | |
| BFFC | Feed forward | 0.25 Hz | .969 |

| NAME | DESCRIPTION | PHYSICAL VALUE | ECU VALUE |
|------|-------------|----------------|-----------|
|      | filter frequency | (Tsamp = 0.10) |      |

The following Table VII sets forth exemplary values for the special start variables for use in association with the special start constants of Table VII in a preferred embodiment.

| NAME | DESCRIPTION | PHYSICAL VALUE |
|------|-------------|----------------|
| THRT | Throttle position | % throttle |
| TENMAX | Feed forward maximum torque | ft-lb |
| TMAXF | Filtered feed forward torque | ft-lb |
| XSSC | Feed forward filter state variable | ft-lb |
| XINT | Integrator state variable | psi |
| RATC | Belt ratio | |
| TRQSN | Ratio adjusted feed forward | ft-lb |
| PCLUN | Feed forward pressure | psi |
| NCI | Input clutch speed | rpm |
| NCO | Output clutch speed | rpm |
| E1SS | Speed error | rpm |
| E2SS | Absolute speed error | rpm |
| E3SS | Integrator control signal | psi |

The present invention has been described above in terms of a number of preferred embodiments, logic steps and the features thereof. Those features which are deemed to be novel are set forth with particularity in the appended claims. Such modifications and alterations as would be apparent to one of ordinary skill in the art, and familiar with the teachings of this application, are also deemed to fall within the spirit and scope of the present invention. Interconnections between the system of the present invention and other elements in the a CVT system and specific program instructions based on the accompanying flow charts are deemed to be within the ordinary skill of the art. Likewise, a number of parameter values are set forth for purposes of acceptable example only. Variation in parameter value can be expected and selection of appropriate values for particular applications consistent with the foregoing description is deemed to be within the skill in the art.

I claim:

1. In a continuously variable transmission system for providing torque transfer in a vehicle having a fluid actuated clutch apparatus and operable in a plurality of operating modes including a forward mode and a reverse mode, a clutch control system for regulating fluid flow for controlling torque transfer by said fluid actuated clutch apparatus, comprising:

means for sensing the vehicle operating mode; and means responsive to said means for sensing the vehicle operating mode for supplying a first set of parameters for controlling fluid flow to said fluid actuated clutch apparatus in response to a sensing of a forward mode and a second set of fluid transfer parameters for controlling fluid flow to said fluid actuated clutch apparatus in response to a sensing of a reverse mode.

2. In a continuously variable transmission system for providing torque transfer in a vehicle having a fluid actuated clutch apparatus and operable in a plurality of operating modes including a forward mode and a reverse mode, a method for providing a clutch control to regulate fluid flow for controlling torque transfer by said fluid actuated clutch apparatus, comprising:

sensing the vehicle operating mode;

supplying a first set of parameters for controlling fluid flow to said fluid actuated clutch apparatus in response to the sensing of a forward mode; and supplying a second set of parameters for controlling fluid flow to said fluid actuated clutch apparatus in response to a sensing of a reverse mode.

3. In a continuously variable transmission system, a clutch control system operable in a plurality of operating modes including a first operating mode for controlling fluid flow under pressure to actuate a clutch comprising:

means for sensing the operating mode;

means for obstructing fluid flow to said clutch in response to a sensed first operating mode;

pressure sensing means for sensing whether the pressure of said fluid flow upstream of said means for obstructing is less than a first pre-selected trigger pressure value, said trigger value falling within normal operating pressures of said controlling fluid flow; and means responsive to said pressure sensing means for providing fluid flow at a first rate to said clutch when said sensed pressure is less than said first trigger value.

4. The system of claim 3 wherein:

said pressure sensing means further comprises means for sensing whether said pressure of said fluid flow is greater than a second preselected trigger pressure value, said second trigger pressure value falling within normal operating pressures of said controlling fluid flow; and wherein said means responsive to said pressure sensing means provides fluid to said clutch at a second rate when said pressure is greater than said second trigger value.

5. The system of claim 4 wherein said second trigger pressure value corresponds to the touch-off pressure for said clutch.

6. The system of claim 3 wherein said first fluid flow rate is a maximum fluid flow rate for the clutch control system.

7. The system of claim 4 further comprising:

first delay means for providing fluid flow at said first rate for a period sufficient under normal operating conditions of said transmission for said sensing means to sense a pressure of said actuating fluid less than the first preselected value.

8. The system of claim 7 further comprising:

means for enabling said pressure sensing means for a time period sufficient to allow pressure at said clutch to reach at least said second pressure value under normal operating conditions.

9. The system of claim 3 further comprising:

means for sensing whether a forward or a reverse mode has been selected; and means responsive to said means for sensing for supplying said first trigger value having a first pressure value when a forward mode is selected and for supplying said first trigger value having a second pressure value when a reverse mode is selected.

10. The system of claim 4 further comprising:

means for sensing whether a forward or a reverse mode as been selected; and means responsive to said means for sensing for supplying said first trigger value having a first pressure value when a forward mode is selected and for supplying said first trigger value having a second pressure value when a reverse mode is selected.

11. In a continuously variable transmission system, a clutch control system for controlling fluid flow under pressure to actuate a clutch comprising:
   pressure sensing means for sensing whether the pressure of said actuating fluid is less than a first preselected trigger value and whether said pressure of said actuating fluid is greater than a second preselected trigger value if it is not less than said first value;
   means responsive to said pressure sensing means for providing fluid flow at a first rate to said clutch when said sensed pressure is less than said first trigger value and at a second rate when said pressure is greater than said second trigger value;
   means for sensing whether a forward or a reverse mode has been selected;
   means responsive to said means for sensing for supplying a first trigger value when a forward mode is selected and for supplying another first trigger value when a reverse mode is selected; and
   means responsive to said means for sensing for supplying said second trigger value having a first value when a forward mode is selected and for supplying said second trigger value having a second value when a reverse mode is selected.

12. A method for controlling actuating fluid pressure in a clutch control system for a vehicle having a continuously variable transmission system operable in a plurality of operating modes including a forward mode and a reverse mode, comprising:
   sensing a transition from a first to a second selected vehicle operating mode;
   selecting a first set of clutch parameters to control fluid flow to a clutch when said second mode is a forward mode; and
   selecting a second set of clutch parameters to control fluid flow to said clutch when said second mode is a reverse mode.

13. The method of claim 12 wherein said first mode is a neutral mode.

14. The method of claim 12 further including:
   sensing the operating mode of said system;
   obstructing flow of said actuating fluid in response to a sensed first operating mode with an obstruction;
   sensing whether the pressure of said actuating fluid upstream of said obstruction is less than a first threshold value; and
   providing fluid flow at a first rate to said clutch when said sensed pressure is less than said first threshold value.

15. The method of claim 14 further including:
   sensing whether a pressure of said actuating fluid is greater than a second threshold value; and
   providing fluid flow to said clutch at a second rate when said pressure is greater than said second threshold value.

16. The method of claim 15 wherein said second threshold value corresponds to a touch-off pressure for said clutch.

17. The method of claim 14 wherein said first fluid flow rate is a maximum fluid flow rate for the clutch control system.

18. The method of claim 14 further comprising:
   providing fluid flow at said first rate once said transition is sensed at least until said step of sensing whether a pressure is less than a first threshold value is completed.

19. The method of claim 15 further comprising:
   providing fluid flow at said first rate once said transition is sensed at least until said step of sensing whether a pressure is less than a first threshold value is completed.

20. The method of claim 19 further comprising:
   enabling said step of sensing whether a pressure of said actuating fluid is greater than a second treshold value for a time period sufficient to allow the pressure of said actuating fluid to reach said second treshold value under normal operating conditions.

21. A control system for a continuously variable transmission operable in a plurality of operating modes including a first mode and a second mode, having a start clutch member and a clutch control system for controlling fluid flow under pressure to said start clutch member, the clutch control system comprising:
   detection means for sensing the vehicle operating mode;
   obstruction means for obstructing fluid flow to said start clutch member in a first operating mode, and for delivering fluid flow to said start clutch member in a second operating mode;
   pressure sensing means for sensing fluid pressure less than a first pre-selected trigger level upstream of said obstructing means; and
   control means responsive to said pressure sensing means for regulating fluid flow for delivering fluid at a first rate to said start clutch member in response to a sensed pressure less than said preselected trigger level.

22. A control system for a continuously variable transmission operable in a plurality of operating modes including at least one forward mode, at least one reverse mode and a neutral mode, having forward and reverse start clutches and a clutch control system for controlling fluid flow under pressure to said forward and reverse start clutches, the clutch control system comprising:
   detection means for sensing the vehicle operating mode;
   switching means responsive to said operating mode for delivering fluid flow to said forward start clutch in a forward operating mode, to said reverse clutch in a reverse operation mode;
   obstruction means for obstructing fluid flow to both said forward and said reverse start clutches in a neutral operation mode;
   pressure sensing means for sensing fluid pressure less than a first pre-selected trigger level upstream of said obstructing means; and
   means for delivering fluid at a first rate to said forward clutch in response to a pressure less than said preselected trigger level in a sensed forward operation mode and at a second rate to said reverse start clutch in response to a pressure less than said preselected trigger level in a sensed reverse operation mode.

23. A method for controlling actuating fluid pressure in a clutch control system for a continuously variable transmission operable in a plurality of operating modes including at least one forward mode, at least one reverse mode, and a neutral mode, having forward and reverse start clutches comprising the steps:
   sensing the vehicle operating mode;

obstructing fluid flow to said forward start clutch and said reverse start clutch in a neutral operating mode with an obstruction;

sensing fluid pressure less than a first pre-selected trigger level upstream of said obstruction;

delivering fluid flow to said forward start clutch in response to sensing a forward operating mode, said fluid flow being delivered to said forward start clutch at a first rate in response to a sensed fluid pressure less than said first preselected trigger level; and delivering fluid flow to said reverse start clutch in response to sensing a reverse operating mode, said fluid flow being delivered to said reverse start clutch at a second rate in response to a sensed fluid pressure less than said first preselected trigger level.

* * * * *